(12) United States Patent
Imamura (10) Patent No.: US 7,794,250 B2
(45) Date of Patent: Sep. 14, 2010

(54) CARD MOUNTING APPARATUS

(75) Inventor: Motonori Imamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/516,181

(22) PCT Filed: Nov. 22, 2007

(86) PCT No.: PCT/JP2007/072690

§ 371 (c)(1),
(2), (4) Date: Sep. 14, 2009

(87) PCT Pub. No.: WO2008/062881

PCT Pub. Date: May 29, 2008

(65) Prior Publication Data

US 2010/0075525 A1 Mar. 25, 2010

(30) Foreign Application Priority Data

Nov. 22, 2006 (JP) ............................. 2006-316338

(51) Int. Cl.
*H01R 13/62* (2006.01)
(52) U.S. Cl. ..................................................... 439/159
(58) Field of Classification Search ................. 439/326, 439/325, 69, 638, 159, 910, 926
See application file for complete search history.

(56) References Cited

U.S. PATENT DOCUMENTS 6,226,189 B1 * 5/2001 Haffenden et al. .......... 361/814
6,241,557 B1 * 6/2001 Reichardt ................... 439/637
6,450,408 B2 * 9/2002 Shiue ......................... 235/492
6,461,193 B1 * 10/2002 Matthies .................... 439/509
6,550,684 B1 * 4/2003 Zuin et al. .................. 235/486
7,093,764 B1 * 8/2006 Valenzuela et al. ......... 235/486
7,252,527 B2 * 8/2007 Yang et al. .................. 439/325
7,344,401 B2 * 3/2008 Zuo et al. ................... 439/326
7,445,510 B2 * 11/2008 Feng et al. .................. 439/630
7,447,522 B2 * 11/2008 Kumazawa et al. ......... 455/558

FOREIGN PATENT DOCUMENTS

EP           1 074 936 A1      2/2001

(Continued)

*Primary Examiner*—T C Patel
*Assistant Examiner*—Harshad C Patel
(74) *Attorney, Agent, or Firm*—Hogan Lovells US LLP (57) ABSTRACT

A card mounting apparatus 10 comprises a housing 3 having a card chamber 3*f* into which a card is inserted through an opening and a card holder 12 having a card facing surface and accommodated in the card chamber so as to be moved forward to be outside of the housing and backward to be inside of the housing. The housing has projected parts projecting into the card chamber from an inner wall of the card chamber, and the card holder has a pull tab exposed through the opening of the housing on one end and a card engagement part 12*c* contacting with the card by a forward movement of the card holder and moving the card forward on the other end opposite to the end with the pull tab. The housing also has a guide 12*e* extending in a direction of the forward and backward movements of the card holder on a surface opposite to the facing surface, and the projected parts of the housing engage with the guide and guide the forward and backward movements of the card holder. Thereby a wrong insertion and damaging of a card or a card holder can be inhibited beforehand.

11 Claims, 11 Drawing Sheets

FOREIGN PATENT DOCUMENTS

| | | |
|---|---|---|
| JP | 60-163598 | 10/1985 |
| JP | 2002-032715 | 1/2002 |
| JP | 2004-222170 | 8/2005 |
| WO | WO00/46744 | 8/2000 |

\* cited by examiner

CARD MOUNTING APPARATUS

CROSS-REFERENCE TO THE RELATED APPLICATIONS

This application is a national stage of international application No. PCT/JP2007/072690 filed Nov. 22, 2007, which also claims the benefit of priority under 35 USC 119 to Japanese Patent Application No. 2006-316338 filed Nov. 22, 2006, the entire contents of which are incorporated herein by reference.

TECHNICAL FIELD

This invention is related to a card mounting apparatus.

BACKGROUND ART

As a card mounting apparatus, for example, a fold type portable electronic apparatus disclosed in Patent Document 1, on which a plurality of IC cards are mounted in a space-saving way, is conventionally known. The conventional card mounting apparatus allows an SIM (Subscriber Identity Module) card, a kind of IC card, to be inserted into and removed from a card chamber in the fold type cellular phone by sliding it back and forth along with an SIM tray with the card accommodated therein.

Patent Document 1: Japanese Patent Application Laid-open No. 2004222170

SUMMARY OF INVENTION

Technical Problem

However, it is a problem in the conventional card mounting apparatus that, if a user tries to insert the SIM card on an opposite side (lower side) instead of a card receiver side, it is not possible to prevent the SIM card or the SIM tray from being damaged by a wrong insertion beforehand, since there is no measure to prevent such a wrong insertion.

Solution to Problem

The invention is aimed at solving the above-mentioned problem advantageously. A card mounting apparatus according to the invention comprises a housing having a card chamber into which a card is inserted through an opening, and a card holder having a card facing surface and accommodated in the card chamber, the card holder adapted to be moved forward from the opening to be outside of the housing as well as backward to be inside of the housing again. The housing comprises projected parts extending from an inner wall which defines the card chamber, into the card chamber, wherein the card holder comprises a pull tab which is exposed from the opening of the housing, on one end, a card engagement part contacting with the card and moving it forward by a forward movement of the card holder on the other end opposite to the end with the pull tab and a guide extending in a direction of the forward and backward movements of the card holder. The projected parts of the housing engage with the guide to guide the forward and backward movement of the card holder.

ADVANTAGEOUS EFFECTS ON INVENTION

In the card mounting apparatus of the present invention, the housing has the card chamber into which the card is inserted through the opening, and the projected parts extending from the inner wall, which defines the card chamber, into the card chamber; and a card holder comprises a card facing surface and is accommodated in the card chamber, the card holder being able to be moved forward through the opening from the housing as well as backward into the housing again. The card holder further comprises a pull tab on one end, which is exposed from the opening of the housing, a card engagement part contacting with the card and moving it forward by a forward movement of the card holder on the other end opposite to the end with the pull tab, and a guide extending in a direction of the forward and backward movement of the card holder. The projected parts of the housing engage with the guide to guide the forward and backward movements of the card holder. Thereby, upon insertion of a card, the card is moved and inserted into the card chamber with the card holder from the opening of the housing by sliding the card along the card facing surface of the card holder which is either moved backward into the card chamber, or moved forward from the card chamber. Upon removing a card, if the card holder is moved forward from the card chamber through the opening of the housing by pulling the pull tab, the card engagement part engages with the card held on the card facing surface and moves it forward, and thereby the card is removed from the card chamber through the opening of the housing.

Further, if the card holder is moved forward or backward, the projected parts extending from the inner wall of the card chamber of the housing into the card chamber engage with a guide extending in a direction of forward and backward movements of the card holder, and guide the forward and backward movements of the card holder. Upon insertion of a card, if the card is about to be inserted into the card chamber from the opening of the housing along a surface opposite to the card facing surface of the card holder, the card is contacted with the projected parts projecting into the card chamber and a further insertion of the card is reliably prevented.

With the card mounting apparatus of this invention, upon insertion of a card, if the card is about to be inserted on the opposite surface side instead of the card facing surface, it is ensured that a wrong insertion and damaging of a card or a card holder can be inhibited beforehand.

BRIEF DESCRIPTION OF DRAWINGS

FIGS. 1(a) and (b) are a sectional view along line A-A in FIG. 2 showing an embodiment of a card mounting apparatus of the present invention for a fold type cellular phone as a portable electronic apparatus;

REFERENCE SIGNS LIST 1 fold type cellular phone
2 display side housing
2a, 3a front case
2b, 3b rear case
3 character input side housing
3c battery receiver
3d opening
3e opening
3f card chamber
3g projected parts
4 hinge
5 liquid crystal display unit
6 circuit board
7 shield case
8 operational key
9 battery cover
10 card mounting apparatus
11 UIM card
12 UIM drawer
12a card holding surface
12b pull tab
12c card engagement part
12d fitting part
12e elongated guide hole
13 card holder
13a connector
13b metal plate
13c inlet
13d spring terminal

DESCRIPTION OF EMBODIMENTS

Figure 1:
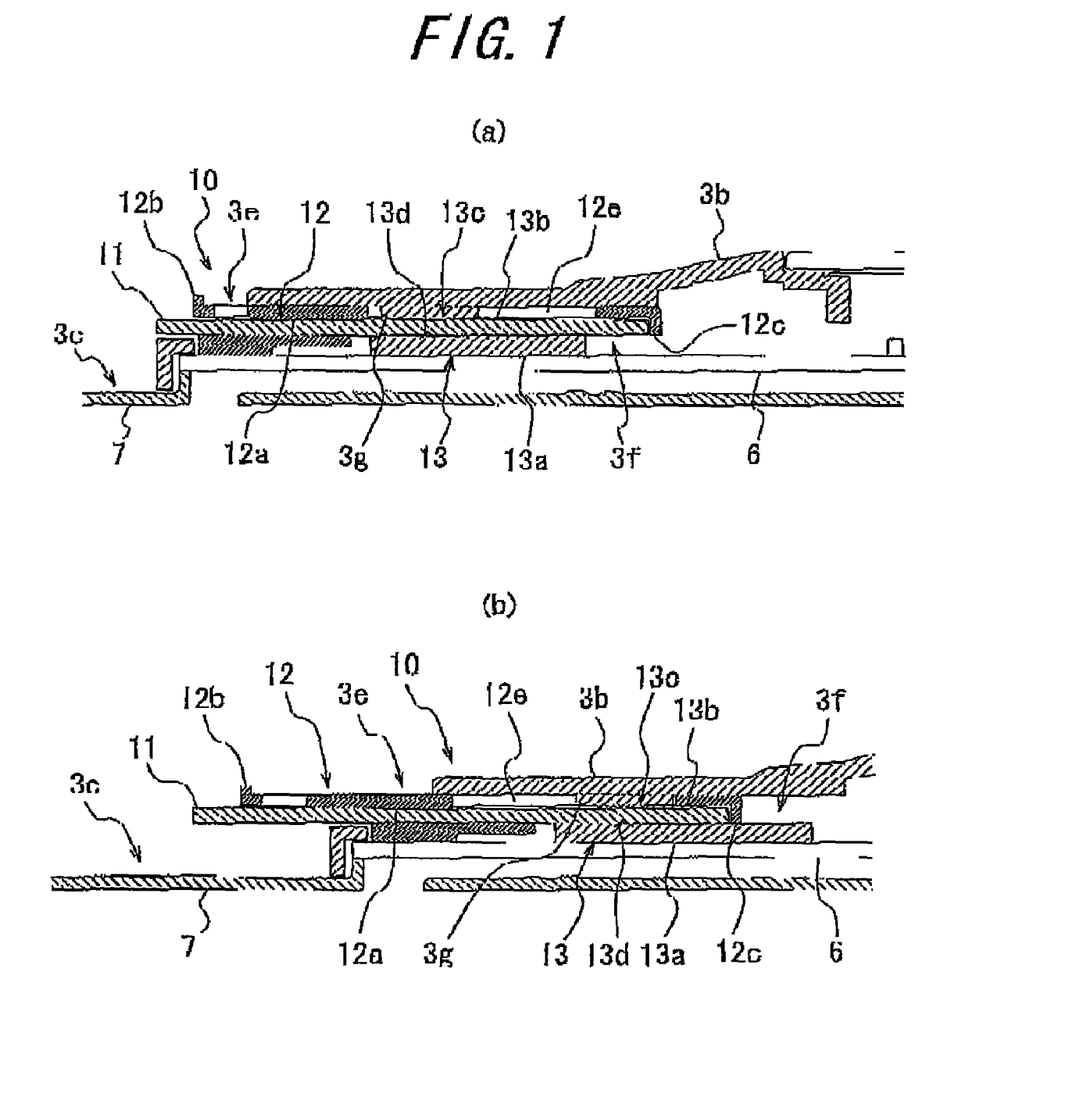
Figure 2:
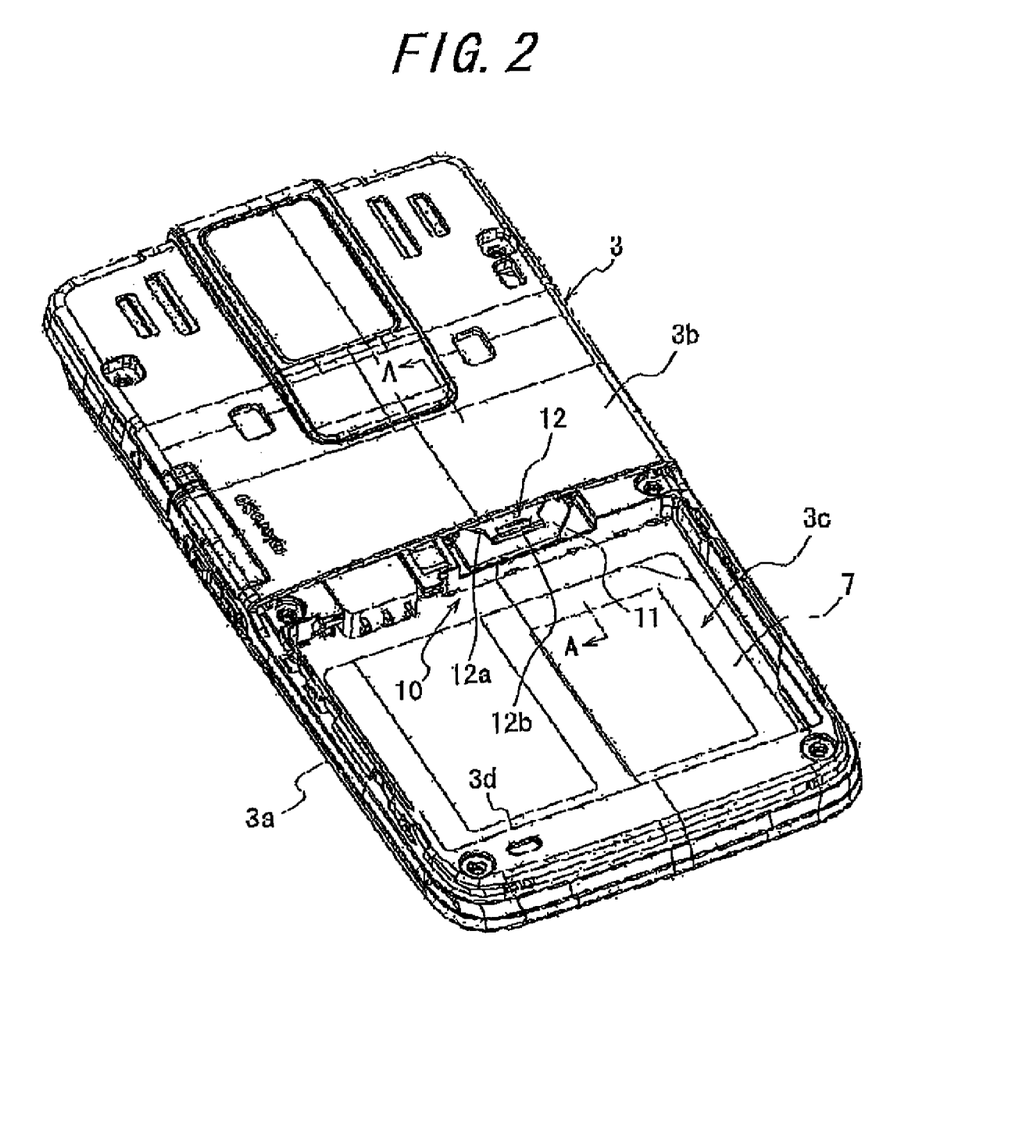
FIG. 2 is a perspective view from a rear case side showing a character input side housing of the fold type cellular phone without a battery cover and a battery.

Preferred embodiments of the present invention will now be described with reference to the accompanying drawings. FIG. 1 is a sectional view along line A-A in FIG. 2, which shows an embodiment of a card mounting apparatus of the present invention for a fold type cellular phone as a portable electronic apparatus; FIG. 2 is a perspective view from a rear case side showing a character input side housing of the fold type cellular phone without a battery cover and a battery; FIG. 3(a) is a perspective view from the front case side and FIG. 3(b) is a perspective view from the rear case side of the fold type cellular phone, respectively, with a display side housing and the character input side housing opened to each other; FIG. 4(a) is a perspective view from the front case side and FIG. 4(b) is a perspective view from the rear case side of a fold type cellular phone, respectively, with the display side housing and the character input side housing closed to each other; and FIG. 5 is an exploded perspective view of the fold type cellular phone showing the structure inside of the character input side housing as well as the structure of the card mounting apparatus of this embodiment. Reference numeral 1 indicates the fold type cellular phone and reference numeral 10 indicates the card mounting apparatus of this embodiment.

Figure 3:
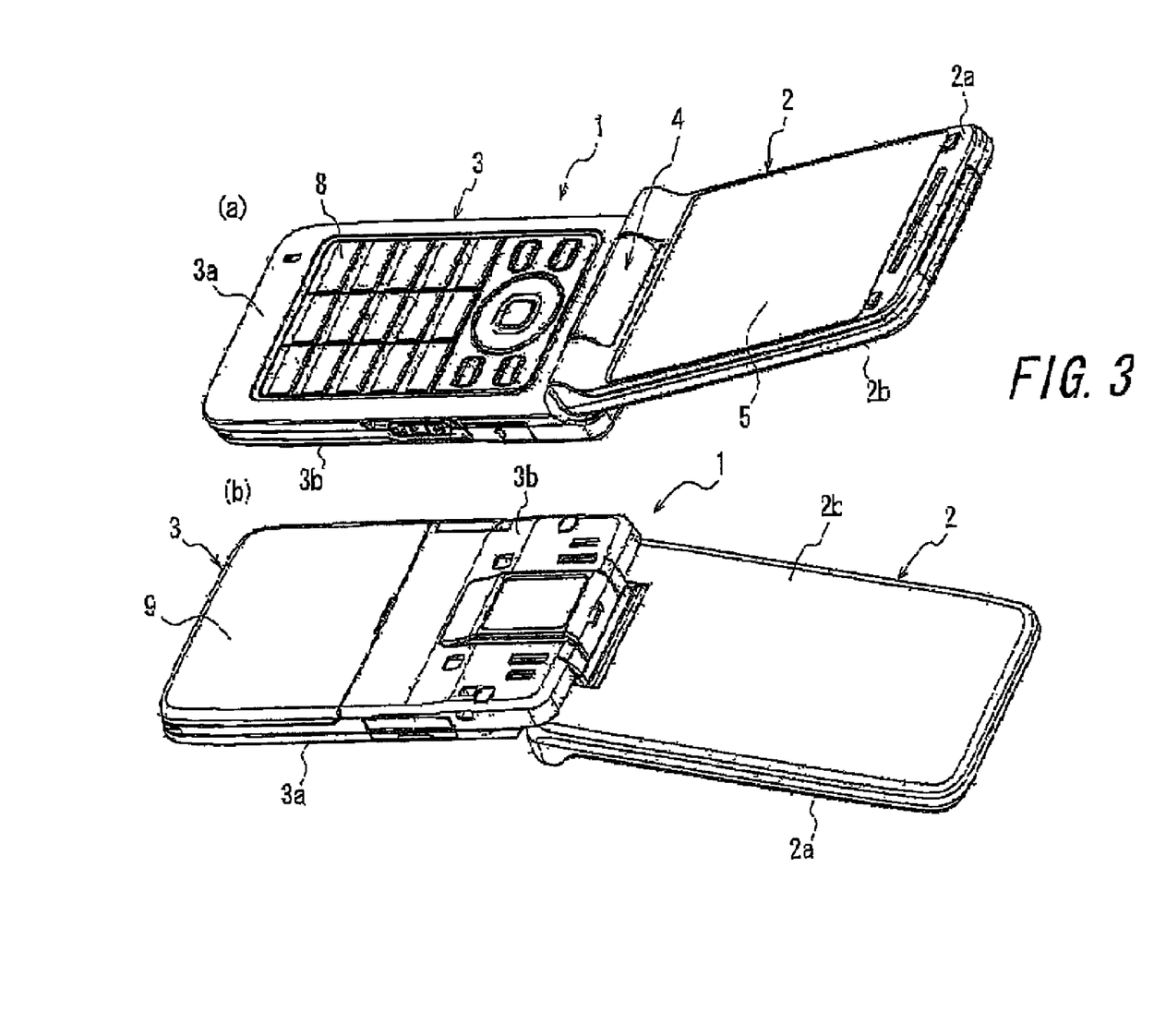
FIG. 3(a) is a perspective view from a front case side and FIG. 3(b) is a perspective view from the rear case side of the fold type cellular phone, respectively, with a display side housing and the character input side housing opened to each other.
Figure 4:
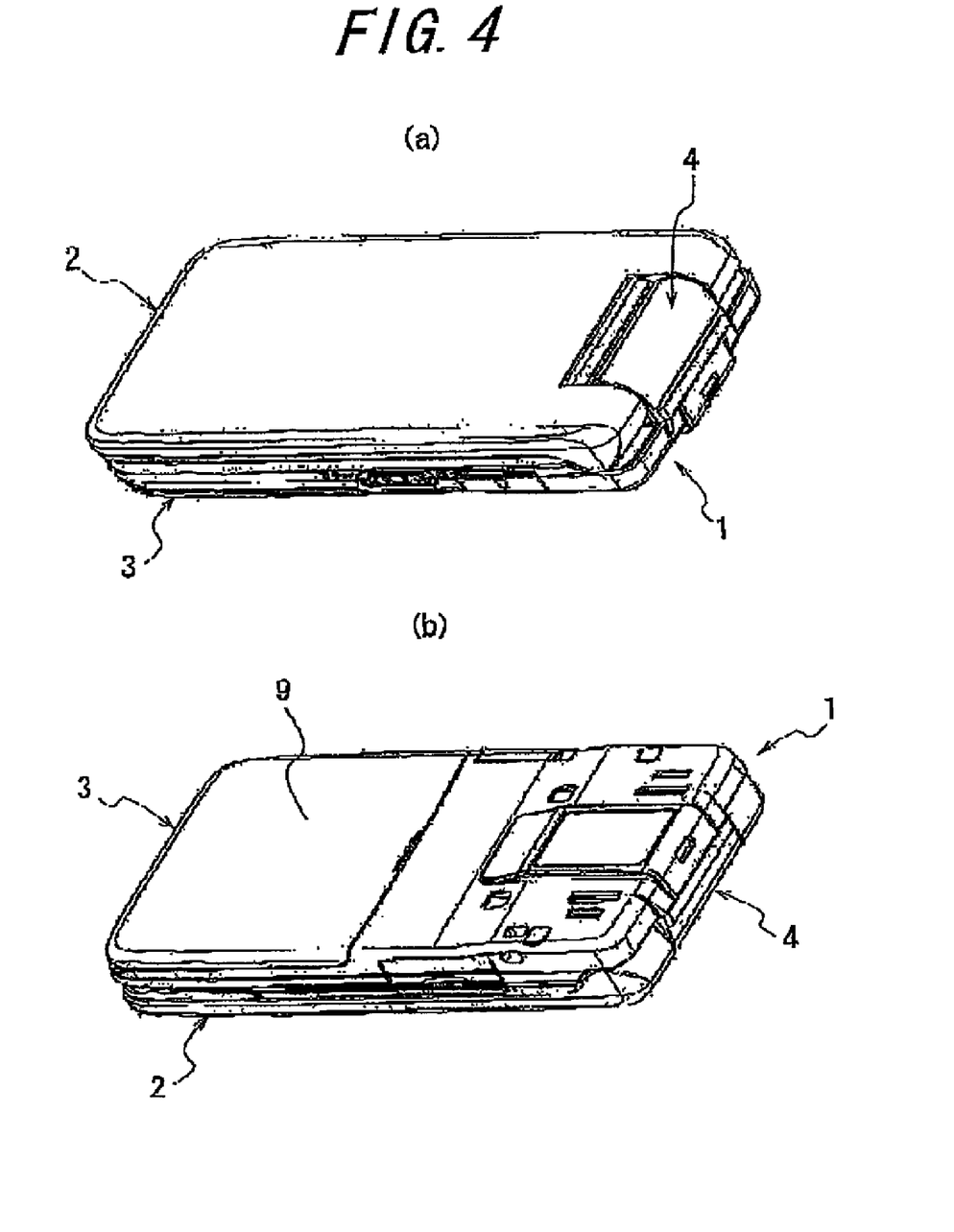
FIG. 4(a) is a perspective view from a front case side and FIG. 4(b) is a perspective view from the rear case side of the a fold type cellular phone, respectively, with the display side housing and the character input side housing closed to each other.
Figure 5:
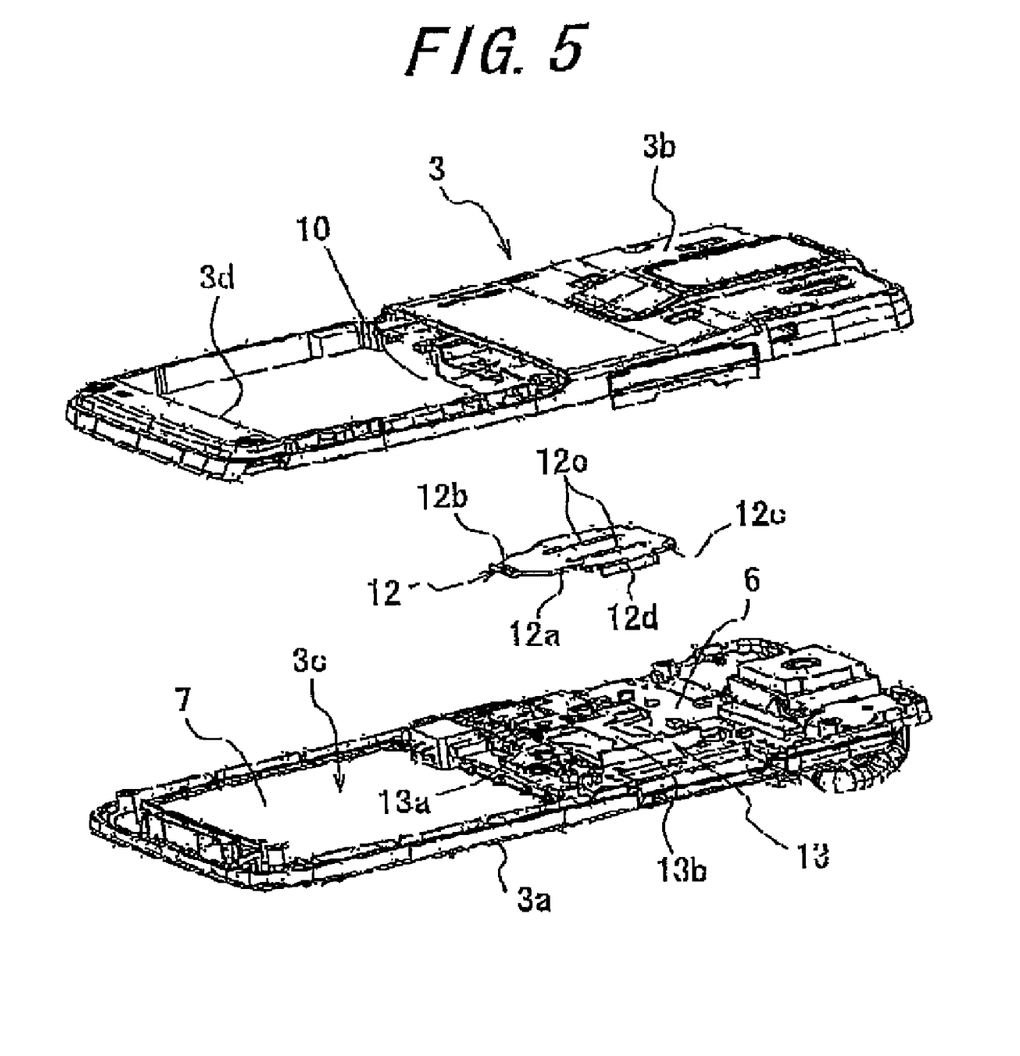
FIG. 5 is an exploded, perspective view of the fold type cellular phone showing the structure inside of the character input side housing as well as the structure of the card mounting apparatus of the embodiment.

As shown in FIG. 3 and FIG. 4, the fold type cellular phone 1 comprises a display side housing 2 and a character input side housing 3. The display side housing 2 is formed by fitting a front case 2a and a rear case 2b to each other and fixing them with a screw for fixing the cases. Similarly, the character input side housing 3 is formed by fitting a front case 3a and a rear case 3b to each other and fixing them with a screw for fixing the cases. The display side housing 2 and the character side housing 3 are connected to each other by a hinge 4, so that they can be opened and closed freely to each other.

The display side housing 2 includes a circuit board (not shown) implemented inside of the front case 2a and the rear case 2b. A liquid crystal display unit 5 is arranged on a surface of the circuit board such that it can be visually recognized from the front case 2a via a trim plate. Further, various electronic parts such as speakers and the like are implemented on and connected to the circuit board.

As shown in FIG. 5, the character input side housing 3 includes a circuit board 6 inside of the front case 3a and the rear case 3b, and a conductor and a metal shield case 7 as an electromagnetic shield are provided on the back surface of the circuit board 6 in a overlapping way. A not shown key flexible printed circuit board (key FPC) which forms a key circuit board and on which a plurality of key switches are mounted, is arranged on top of the metal shield case 7. Operational keys 8 shown in FIG. 3(a) are arranged in a position opposite to the key switch of a key sheet (not shown), respectively, which is arranged on top of the key FPC, and are exposed from the front case 3a. In addition, various electronic parts such as microphones and the like are implemented on the circuit board 6 and electrically connected thereto.

As shown in FIG. 2, a battery receiver 3c is provided in the character input side housing 3 to receive a battery (not shown) and an opening 3d for inserting and removing a battery is formed in the rear case 3b of the character input housing 3, and further, a battery cover 9 covering the opening 3d is detachably mounted thereon, as shown in FIG. 3

The card mounting apparatus 10 according to this embodiment, provided in such a character input side housing 3 of the fold type cellular phone 1, is used, for example, for detachably mounting a UIM (User Identity Module) card 11 as an IC card on the fold type cellular phone 1. The card mounting apparatus 10 comprises the character input side housing 3 of the fold type cellular phone 1 as a housing and a UIM drawer 12 as a card holder, as shown in FIG. 1 and FIG. 5. Between the rear case 3b and the circuit board 6, the character input side housing 3 defines a card chamber 3f into which the UIM card 11 is inserted through an opening 3e open to the battery receiver 3c, and comprises a connector 13a with a spring terminal 13d as well as a card holder 13 having a metal plate 13b opposite to the connector 13a.

The UIM drawer 12 forms a plate like shape having a cross section with approximate U shape and a card holding surface (a card facing surface) on one surface (lower surface in FIG. 1 and FIG. 5), and is disposed between a back surface of the rear case 3b and a metal plate 13b of a card holder 13, so that it can slide between a backward position inside of the housing as shown in FIG. 1(*a*) and a forward position outside of the housing as shown in FIG. 1(*b*). The card holder 13 is implemented on the circuit board 6, for example, by means of soldering and the like, and comprises an inlet 13*c* between the connector 13*a* and the metal plate 13*b*, into which the UIM card 11 held on the card holding surface 12*a* of the UIM drawer 12 can be inserted in a direction of the opening 3*e* of the character input side housing 3. The UIM card 11 has a memory means storing information and a terminal face (exposed face) on the surface of the UIM card 11 which is electrically connected to the memory means. As shown in FIG. 1(*a*), a spring terminal 13*d* of the connector 13*a* is held on a card holding face 12*a* of the UIM drawer 12 which is moved backward to a predetermined position, and is located in a predetermined inserted position within the card chamber 3*f*, resiliently deforming and resting against a terminal face (not shown) of the UIM card 11 located in the card holder 13, and is electrically contacted with the terminal face.

Figure 6:
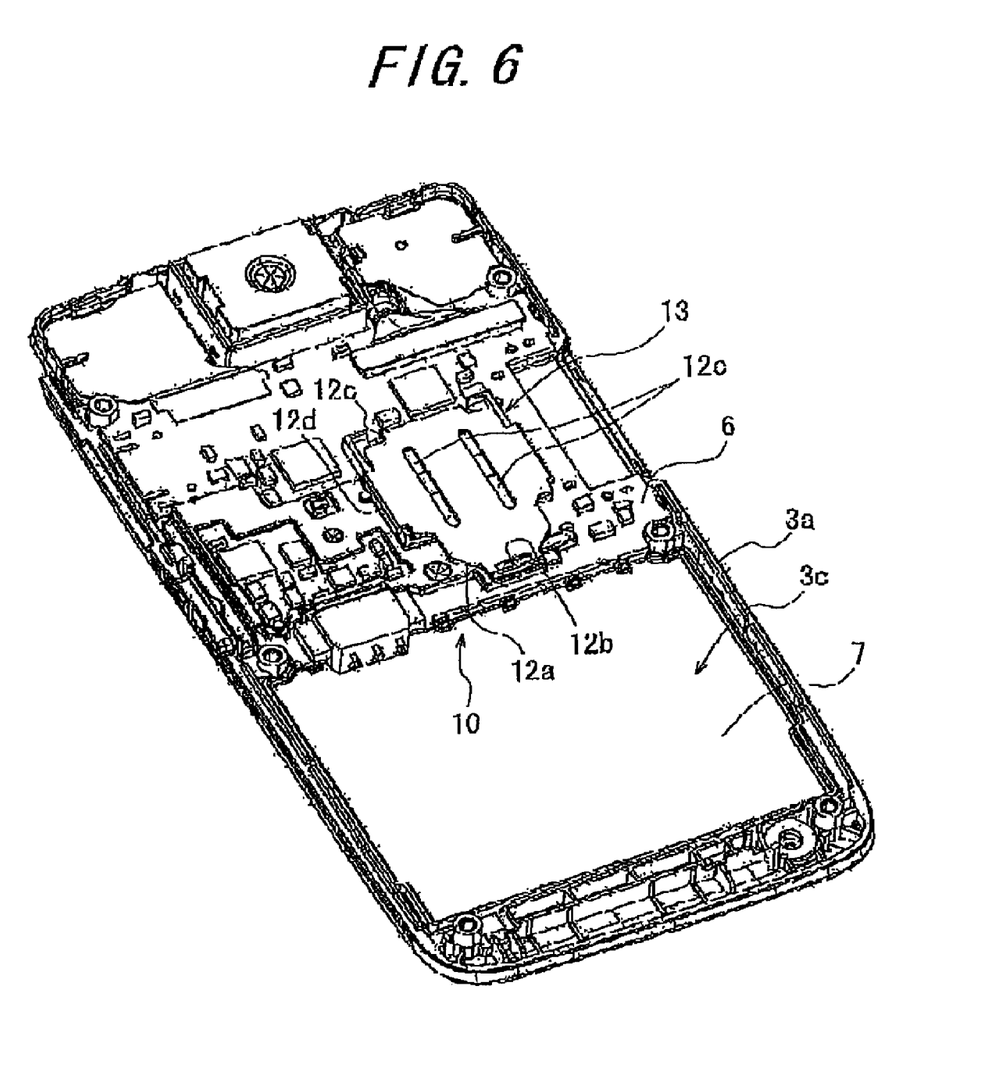
FIG. 6 is a perspective view of the fold type cellular phone from the rear case side showing the character input side housing without the rear case.
Figure 7:
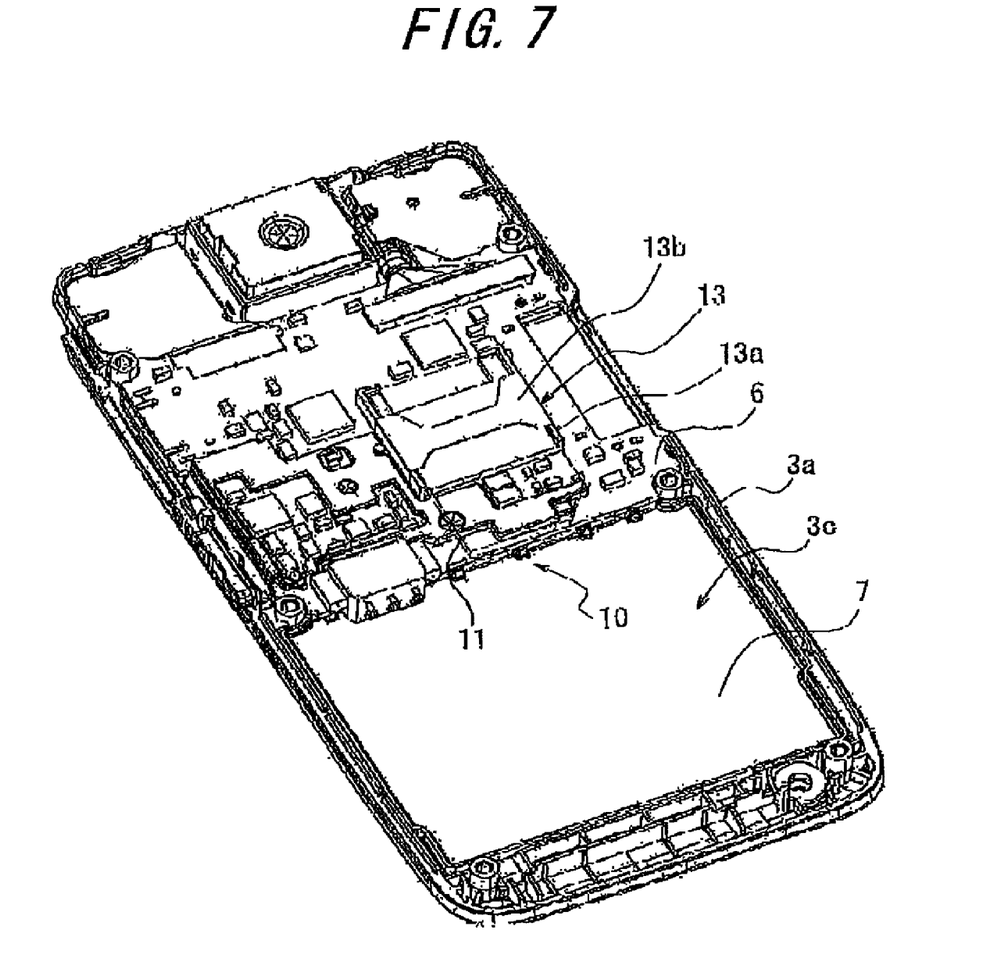
FIG. 7 is a perspective view of the fold type cellular phone showing the character input side housing without a UIM drawer.
Figure 8:
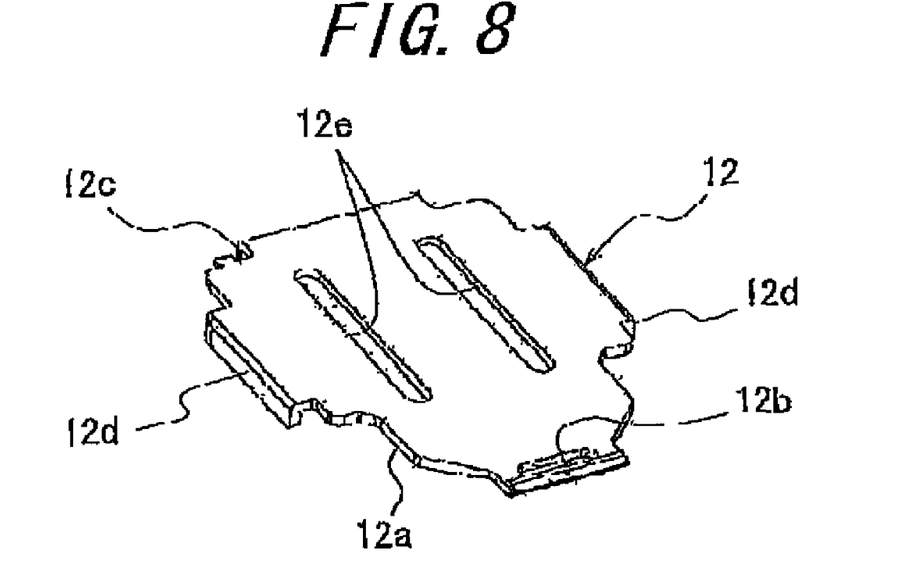
FIG. 8 is a perspective view of the UIM drawer of the card mounting apparatus in the embodiment described above in the same orientation shown in FIG. 6.
Figure 9:
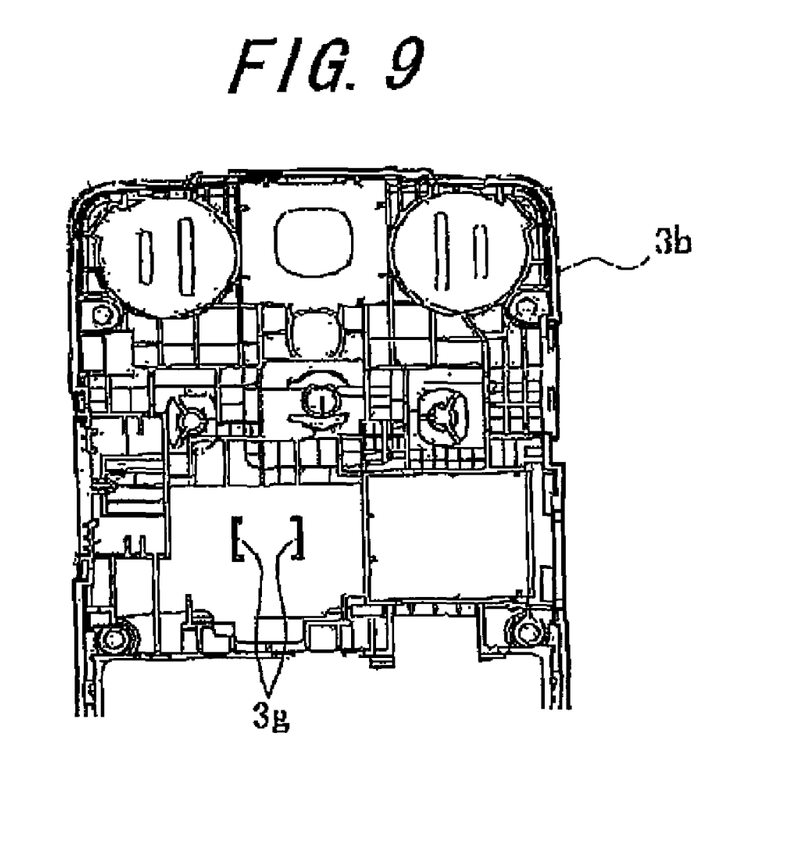
FIG. 9 is a plan view of the rear case of the character input side housing in a card mounting apparatus according to the embodiment above from the back side.
Figure 10:
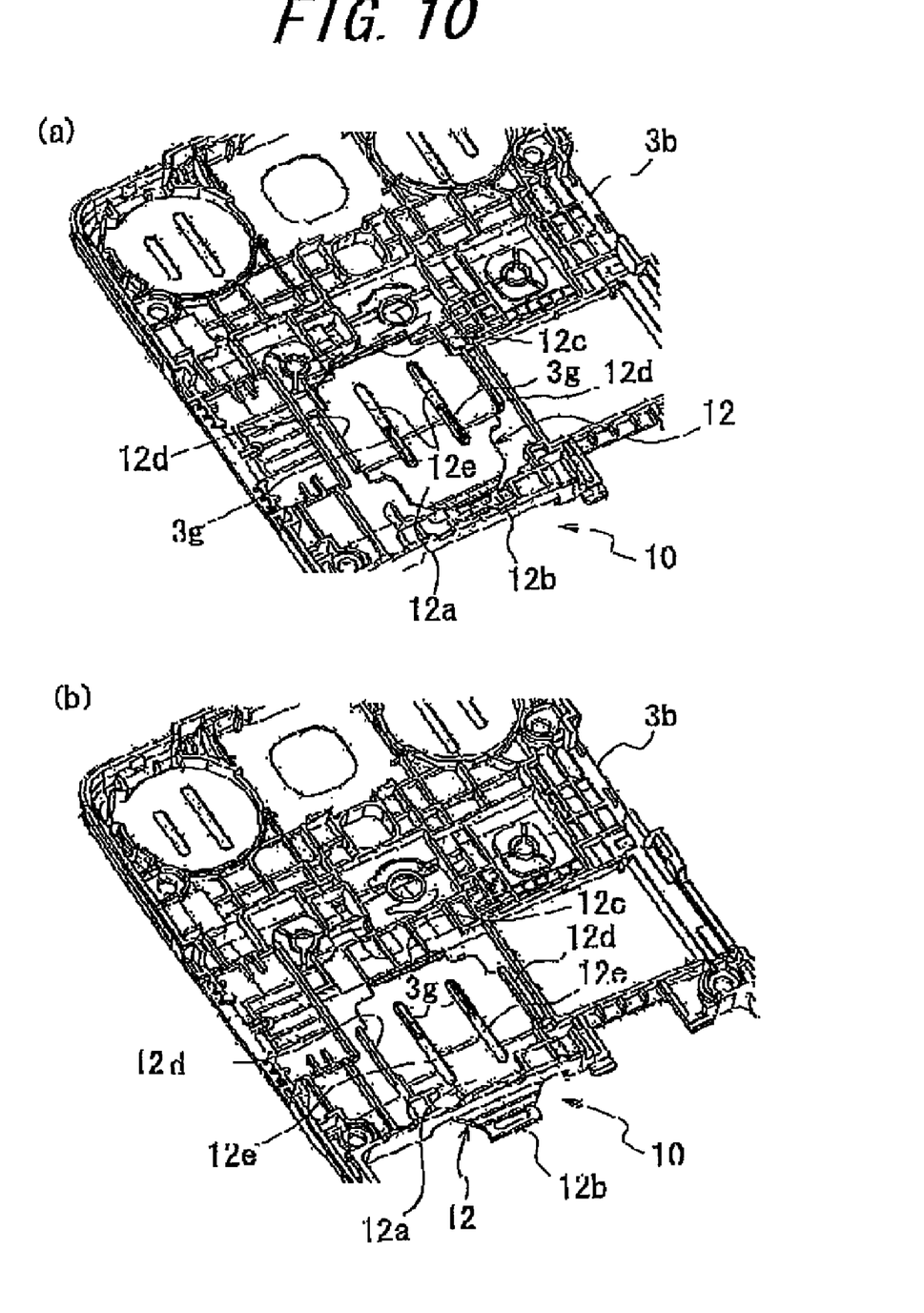
FIG. 10(a) is a perspective view of the UIM drawer moved backward and FIG. 10(b) is a perspective view of the UIM drawer moved forward, engaging with a projection of the rear case, respectively, viewing from the back side of the rear case.
Figure 11:
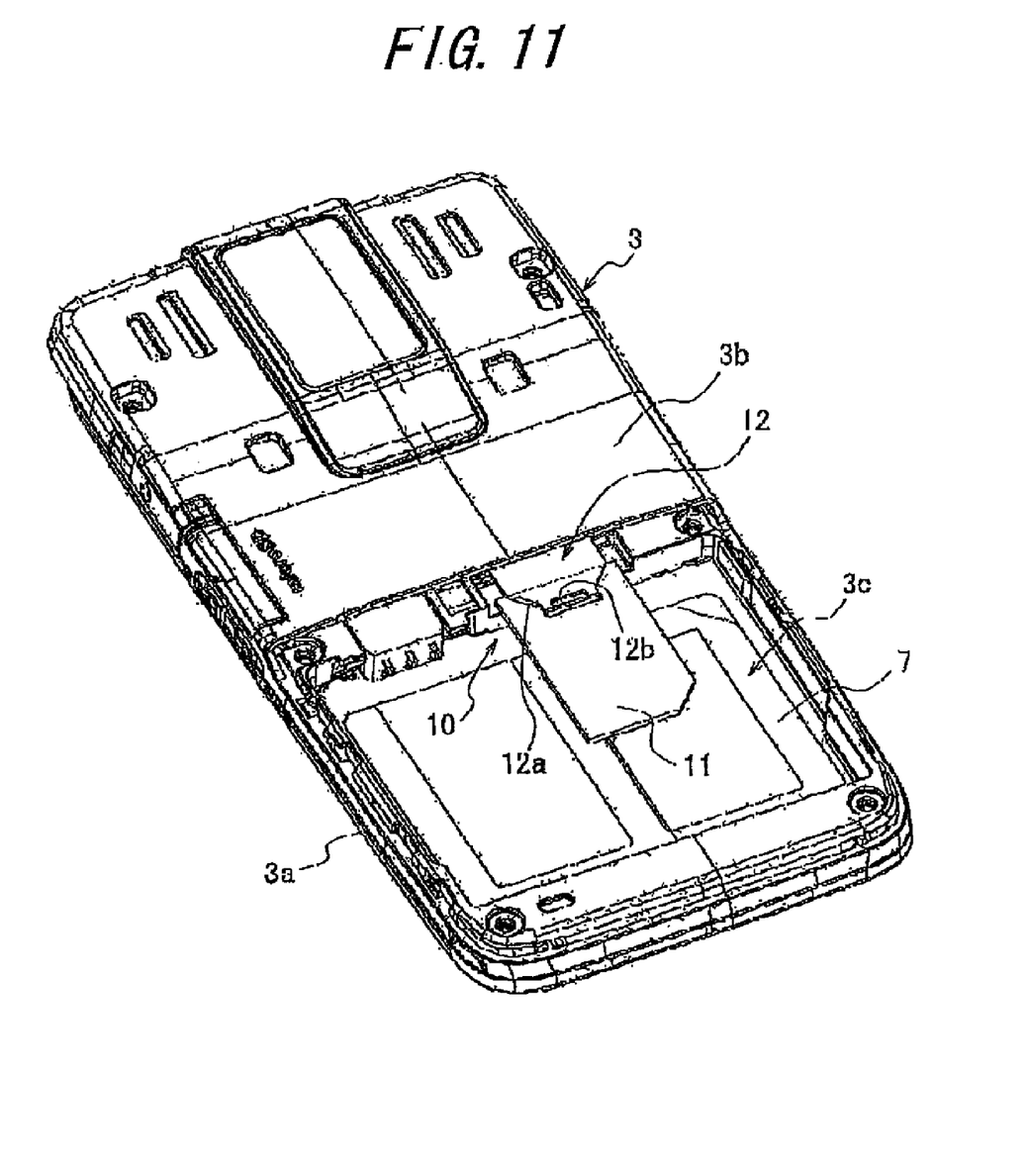
FIG. 11 is a perspective view of a character input side housing of the fold type cellular phone with the UIM drawer moved forward and the UIM card removed.

The card mounting apparatus 10 of this exemplary embodiment is further described now with reference to the accompanying drawings. FIG. 6 is a perspective view of the fold type cellular phone from the rear case side showing the character input side housing without the rear case 3*b*; FIG. 7 is a perspective view of the fold type cellular phone showing the character input side housing 3 without the UIM drawer 12; FIG. 8 is a perspective view of a UIM drawer 12 of the card mounting apparatus 10 in the embodiment described above in the same orientation shown in FIG. 6; FIG. 9 is a plan view of the rear case 3*b* of the character input side housing 3 in the card mounting apparatus 10 according to the embodiment above from the back side; FIG. 10(*a*) is a perspective view of the UIM drawer moved backward and FIG. 10(*a*) is a perspective view of the UIM drawer moved backward and FIG. 10(*b*) is a perspective view of the UIM drawer moved forward, engaging with a projection of the rear case, respectively, viewing from the back side of the rear case; FIG. 11 is a perspective view of the character input side housing 3 of the fold type cellular phone with the UIM drawer 12 moved forward and the UIM card 11 removed.

As shown in FIG. 8 and FIG. 1, the UIM drawer 12 comprises on one end (on the left end in FIG. 1) thereof, a pull tab 12*b* which is exposed from the opening 3*e* and forms a projection extending from the opposite face of a card holding face 12*a*, and a card engagement part 12*c* projecting from the card holding face 12*a* on the other end (on the right end in FIG. 1) opposite to the end with the pull tab 12*b*. As shown in FIG. 1(*b*), the card engagement part 12*c* is contacted with a UIM card 11 held on the card holding face 12*a* and the card is moved forward by a forward movement of the UIM drawer 12 through the opening 3*e* of the character input side housing 3.

In addition, as shown in FIG. 8, the UIM drawer 12 comprises a fitting part 12*d* projecting from the card holding face 12*a* on both sides in a direction traverse to a direction of the forward and backward movements (a right and left direction in FIG. 2), that is a direction connecting a pull tab 12*b* with the card engagement part 12*c*, and extending in a direction of forward and backward movements, thereby forming a cross section with approximate U shape as described above. Both sides of the card holder 13 are fitted between the fitting parts 12*d*. As shown in FIG. 8, two elongated guide holes 12*e* as a guide are formed in a flat part of the UIM drawer 12 surrounded by a pull tab 12*b*, the card engagement part 12*c* and fitting parts 12*d* on both traverse sides and extends in a direction of forward and backward movements. As shown in FIG. 1, the flat part closer to the pull tub 12*b* rather than to the elongated guide holes 12*e* is reduced its thickness and formed as an insertion part, and thereby forming an inclination on the side of the card holding face 12*a* to the pull tab 12*b* in order to facilitate an insertion of the UIM card 11. Further, a thick part compared to other portions of the flat part near the pull tab 12*b* is formed on a portion of the flat part which is located opposite to the spring terminal 13*d* when the UIM drawer 12 is moved backward to a predetermined position.

As shown in FIG. 1 and FIG. 10, two projected parts 3*g* are formed on the back side of the rear case 3*b* of the character input side housing 3, opposite to the spring terminal 13*d* on a connector 13*a* of the card holder 13 and adjacent to an end part of the metal plate 13*b* on the side of the inlet 13*c*. The projected parts 3*g* engage with the two elongated guide holes 12*e* of the UIM drawer 12 and guide forward and backward movements of the UIM drawer 12, as shown in FIGS. 10(*a*) and (*b*). The projected parts 3*g* has a U shape, viewing from the front face, as shown in FIG. 9, in order to prevent a sink mark on the surface of the rear case 3*b* and ensure the rigidity of the projected parts, and so that the corresponding elongated holes 12*e* are not too narrow to be molded. As shown in FIG. 1, the projected parts 3*g* projects slightly from the card holding face 12*a* through the elongated holes 12*e*, and end faces of the projected parts 3*g* are coplanar with the back side of the metal plate 13*b* and smoothly connected with it. The projected parts 3*g* do not necessarily have to project from the card holding face 12*a* through the elongated holes 12*e*.

In this card mounting apparatus 10 according to this embodiment, the character input side housing 3 comprises the card chamber 3*f* into which a card is inserted through the opening 3*e*, and the projected parts 3*g* extending from the inner wall of the card chamber 3*f* into the card chamber 3*f*. The UIM drawer 12 comprises the card holding face 12*a* and is accommodated in the card chamber 3*f*, so that the UIM drawer 12 can be moved forward and backward. The UIM drawer 12 further comprises a pull tab 12*b* on one end, which is exposed from the opening 3*e*, and on the other end opposite to the end with the pull tab, the card engagement part 12*c* which engages with the UIM card 11 held on the card holding face 12*a* and moves the UIM card 11 forward by a forward movement of the UIM drawer 12 through the opening 3*e*. The UIM drawer 12 further comprises the elongated holes 12*e* extending on the opposite side of the card holding face 12*a* in a direction of the forward and backward movements of the UIM drawer 12. The projected parts 3*g* are contacted with the elongated guide holes 12*e* and guide the forward and backward movements of the UIM drawer 12, cooperating with the fitting structure of the fitting parts 12*d* of the UIM drawer 12 and both sides of the card holder 13.

By the structure described above, upon insertion of an UIM card, the UIM card 11 is inserted by sliding it along the card holding face 12*a* of the UIM drawer 12 which is retained in a backward position in the card chamber 3*f*, or the UIM card 11 is inserted by moving it along the card holding face 12*a* of the UIM drawer 12 which is moved forward from the card chamber 3*f*. Thereby, the UIM card 11 is inserted into the card chamber 3*f* through the opening 3; as shown in FIG. 1(*a*) and FIG. 2. In order to remove the UIM card 11, UIM drawer 12 is moved forward from the card chamber 3*f* through the opening 3*e* by pulling the pull tab 12*b* exposed from the opening 3*e* open to the battery receiver 3*c* of the character input side housing 3, with the battery cover 9 and the battery being eliminated. Then the card engagement part 12*c* engages with the UIM card 11 held on the card holding face 12*a*, and moves the UIM card 11 forward, which is then pulled out of the opening 3*e* and removed from the card chamber 3*f*.

Figure 12:
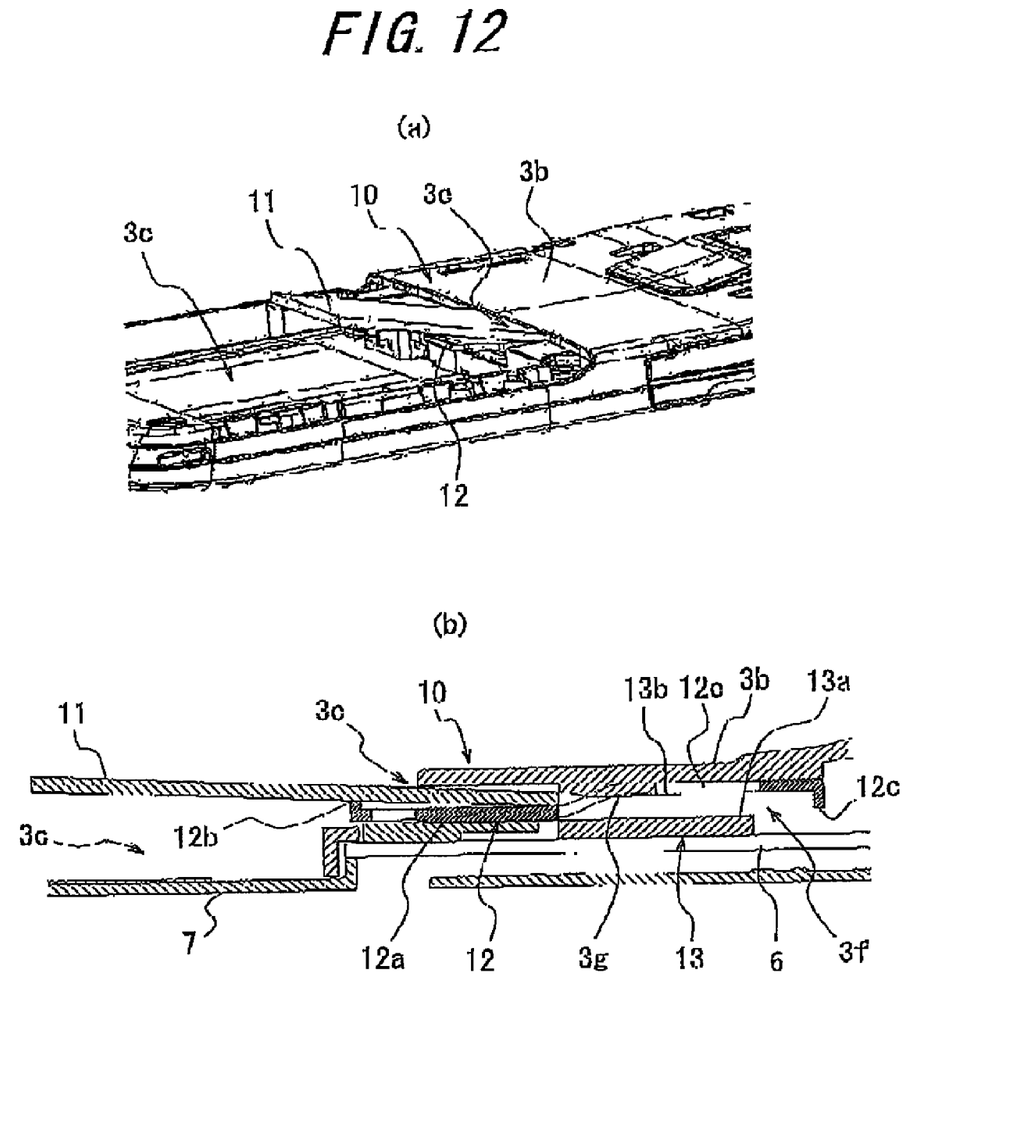
FIG. 12(a) is a perspective view and FIG. 12(b) is a cross-sectional view as FIG. 1 of the character input side housing of the fold type cellular phone, respectively, to show that the card mounting apparatus of the embodiment above inhibits a wrong insertion of the UIM card.

With the card mounting apparatus 10 according to this embodiment, as shown in perspective view in FIG. 12(*a*) as well as in cross section in FIG. 12(b), if the UIM card 11 is about to be inserted into the card chamber 3f from the opening 3e open to the battery receiver 3c of the character input side housing 3 along the face opposite to the card holding face 12a of the UIM drawer 12 by mistake, the UIM card 11 is contacted with the projected parts 3g projecting into the card chamber 3f from the inner wall of the card chamber 3f of the character input side housing 3, so that a further insertion of the UIM card 11 is reliably prevented. Thus, with the card mounting apparatus 10 according to this embodiment, if the UIM card is about to be inserted on the opposite side (lower side) by mistake instead of the card receiving face 12a side, a wrong insertion of the UIM card can be reliably prevented and damaging of the UIM card 11 or the UIM drawer 12 due to the wrong insertion can be inhibited beforehand.

With the card mounting apparatus 10 according to this embodiment, a terminal face of the UIM card 11 is contacted and electrically connected with a spring terminal 13d on the connector 13a in a predetermined position in which the UIM card 11 is moved backward with the UIM drawer 12. Then, the spring terminal 13d deforms resiliently and pushes the UIM card 11, so that the electric connection is maintained in a more suitable way. In the card mounting apparatus 10 according to this embodiment, the projected parts 3g of the character input side housing 3 run through the elongated guide holes 12e of the UIM drawer 12, and are formed higher than the thickness of the circumference of the elongated guide holes 12e in the UIM drawer 12, thereby, projecting from the surrounding card holding face 12a and guiding the UIM card 11 in card chamber 3f by contacting with the UIM card 11 in a sliding way, as shown in FIG. 1(a). In other words, the movement of the UIM card 11 in the backward direction is restricted by the sliding contact between the UIM card 11 and the projected parts 3g. The projected parts 3g are pushed by the spring terminal 13d of the connector 13a, when the connector 13a is contacted with the terminal face of the UIM card and is electrically connected thereto, so that the electric connection between the terminal face of the UIM card 11 and the connector 13 is preferably maintained. Since the projected parts 3g restricts the movement of the UIM card 11 in a direction opposite to the spring terminal 13d, the electric connection can be easily maintained.

In the card mounting apparatus 10 according to this embodiment, the UIM drawer 12 has a thick part compared to other parts of the card holding surface 12a and the thick part is located opposite to the connector 13a, when the UIM drawer 12 is moved backward to a predetermined position. The thick part is pushed by the spring terminal 13d provided on the connector 13a, when the UIM card 11 is held on the card holding face 12a of the UIM drawer 12 which is moved backward to the predetermined position. Then the connector 13a is contacted and electrically connected with the terminal face of the UIM card 11, so that the electric connection between the terminal face of the UIM card 11 and the connector 13 is also preferably maintained in this aspect. The metal plate 13b can be slightly deflected toward the connector 13a by a fine adjustment of the thickness of the card holding face 12a of the UIM drawer 12 around the elongated guide holes 12e, so that the UIM card 11 can be also pushed toward the connector 31a by the metal plate 13b.

With the card mounting apparatus 10 according to this embodiment, the character input side housing 3 comprises a card holder 13 fixed in the card chamber 3f, and the card holder 13 comprises the inlet 13c oriented to the opening 3e open to the battery receiver 3c of the character input side housing 3 and holds the UIM card 11 inserted from the inlet 13c. The UIM drawer 12 is disposed between the inner wall with the projected parts 3g of the card chamber 3f and the card holder 13. The end faces of the end parts of the projected parts 3g passing through the elongated guide holes of the UIM drawer, and the back surface (inner surface) of the metal plate 13b forming the inlet 13c of the card holder 13 are smoothly connected, so that, upon insertion of the UIM card 11 along the card holding face 12a, the UIM card 11 can be inserted without any disturbance, as a result, preventing the UIM card 11 from contacting with the metal plate 13b and being stuck.

Further, the card mounting apparatus of this embodiment is easy to operate, since the UIM drawer 12 is disposed above the UIM card in FIG. 1. In order to move the UIM drawer backward, a user has only to move the UIM card 11 by shifting the pull tub arranged above the UIM card 11 in a backward direction. In other words, if the UIM drawer 12 is arranged below the UIM card 11 in FIG. 1, the pull tab 12b that is to be arranged below the UIM card 11, has to be moved in a backward direction to move the UIM card forward, which may cause an operational problem of the card mounting apparatus, since the UIM card is obstructive, while the pull tab 12b is arranged above the UIM card 11 in the card mounting apparatus according to this embodiment, so that the UIM card is not obstructive.

If the UIM drawer 12 is arranged above the UIM card 11 in FIG. 1 and the card holding face 12a is oriented downward, user may try to insert the UIM card 11 into the card chamber 3f along the face opposite to the card holding face 12a by mistake. The present invention is nevertheless highly beneficial, since, as described above, the projected parts 3g of the card chamber 3f preferably prevent a further insertion of the UIM card 11.

While the invention has been described with reference to exemplary embodiments and drawings, the invention is not limited to the embodiments described above and can be modified appropriately within a scope of claims. For example, the card mounting apparatus of the present invention can be applied to a portable electronic apparatus other than a cellular phone such as a palm top computer or a game machine with a function of wireless communication, or other various electronic apparatuses. A card used in the card mounting apparatus of this invention can be any card other than an IC card such as a UIM card 11, an SIM card and the like.

While the pull tab 12b of the UIM drawer 12 is exposed from the opening 3e open to the battery receiver 3c of the character input side housing 3 and projects from the opposite side of the card holding face 12a in the embodiment described above, the pull tab of the card holder can be provided with a concave part or a slit into which a finger or a nail can be put. Instead of the spring terminal 13d, other connecting terminals, such as a connecting terminal without resiliency can be used.

While the elongated guide holes 12e are formed as a guide in the UIM drawer 12 in the embodiment above, a guide groove can be formed, with which projected parts 3g shorter than those of the embodiment above can engage.

INDUSTRIAL APPLICABILITY

Thus, with the card mounting apparatus of this embodiment, upon insertion of a card, if the card is about to be inserted on the opposite side by mistake instead of the card receiving side, a wrong insertion of the card can be reliably prevented and damaging of the card or the card holder due to the wrong insertion can be inhibited beforehand.

The invention claimed is:

1. A card mounting apparatus comprising: a housing having a card chamber into which a card is inserted through an opening; and a card holder having a card facing surface, and accommodated in the card chamber adapted to be moved forward to be outside of the housing and backward to be inside of the housing;

wherein the housing has projected parts projecting into the card chamber from an inner wall defining the card chamber, the card holder has a pull tab exposed through the opening of the housing on one end, and a card engagement part contacting with the card by a forward movement of the card holder and moving the card forward on the other end opposite to the end with the pull tab, and a guide extending in a direction of the forward and backward movements of the card holder on a surface opposite to the facing surface, and the projected parts of the housing engage with the guide and guide the forward and backward movements of the card holder.

2. The card mounting apparatus according to claim 1, wherein the guide of the card holder is formed as elongated holes running from the facing surface to the surface opposite to the facing surface, and the projected parts of the housing are inserted into the elongated holes, and ends of the projected parts project from the facing surface and are slid along and contacted with the card which is inserted into the card chamber.

3. The card mounting apparatus according to claim 2, wherein the card holder has a thick part compared to other parts of the facing surface, and the thick part faces the connecting terminal on the connector in a predetermined backward position of the card holder.

4. The card mounting apparatus according to claim 3, wherein the thick part of the card holder pushes the card which is moved with the backward movement of the card holder, toward the connecting terminal.

5. The card mounting apparatus according to claim 1, wherein the housing comprises a connector having a connecting terminal in the card chamber, and the connecting terminal is electrically connected to an exposed terminal which is exposed and arranged on the card moved with the backward movement of the card holder.

6. The card mounting apparatus according to claim 2, wherein the housing comprises the card holder fixed in the card chamber, and the thick part pushes the card, which is moved with a backward movement of the card holder, toward the connecting terminal with the card holder.

7. The card mounting apparatus according to claim 5, wherein the projected parts of the housing are arranged in the card chamber, facing with the connecting terminal on the connector, and the projected parts inhibit a movement of the card moved with the backward movement of the card holder, to an opposite side to the connecting terminal.

8. The card mounting apparatus according to claim 7, wherein the projected parts push the card, which is moved with the backward movement of the card holder, toward the connecting terminal.

9. The card mounting apparatus according to claim 1, wherein the housing comprises a card holder fixed in the card chamber, the card holder has an inlet facing the opening of the housing and holds the card inserted from the inlet, the guide of the card holder is formed as elongated holes running from the facing surface to a surface opposite to the facing surface, and the projected parts of the housing are inserted into the elongated holes, and the ends of the projected parts project from the facing surface and slid along and contacted with the card which is inserted into the card chamber, and end faces of the end parts of the projected parts passing through the elongated guide hole and the inner surface of the inlet of the card holder are smoothly connected.

10. The card mounting apparatus according to claim 1, wherein the card holder is accommodated in the card chamber, the facing surface of the card holder being oriented inside of the housing.

11. The card mounting apparatus according to claim 1, wherein the connecting terminal is a spring terminal.

* * * * *